United States Patent

Lindner et al.

Patent Number: 5,183,850
Date of Patent: Feb. 2, 1993

[54] GRAFT POLYMERS AND THEIR USE AS FLAMEPROOFING AGENTS

[75] Inventors: Christian Lindner, Cologne; Herbert Eichenauer, Dormagen, both of Fed. Rep. of Germany

[73] Assignee: Bayer Aktiengesellschaft, Leverkusen, Fed. Rep. of Germany

[21] Appl. No.: 633,028

[22] Filed: Dec. 24, 1990

[30] Foreign Application Priority Data

Jan. 3, 1990 [DE] Fed. Rep. of Germany ....... 4000047
Apr. 5, 1990 [DE] Fed. Rep. of Germany ....... 4010960

[51] Int. Cl.$^5$ .............................................. C08L 51/04
[52] U.S. Cl. ........................................ 525/73; 525/71; 525/72; 525/212; 525/281
[58] Field of Search ........................... 525/73, 212, 281

[56] References Cited

U.S. PATENT DOCUMENTS

| | | | |
|---|---|---|---|
| 4,151,226 | 4/1979 | Morinaga et al. | 525/253 |
| 4,587,162 | 5/1986 | Nagai et al. | 525/281 |
| 4,683,248 | 7/1987 | Rauer et al. | 525/305 |
| 4,912,162 | 3/1990 | Kishida et al. | 525/305 |
| 5,064,906 | 11/1991 | Kishida et al. | 525/305 |

FOREIGN PATENT DOCUMENTS

65885W/40 3/1974 Fed. Rep. of Germany ...... 525/281

*Primary Examiner*—Paul R. Michl
*Assistant Examiner*—Olga Asinovsky
*Attorney, Agent, or Firm*—Connolly & Hutz

[57] ABSTRACT

Graft polymers of
a) 5 to 95% by weight of a copolymer of 20 to 60% by weight of a 1,3,5-triazine derivative corresponding to formula (I)

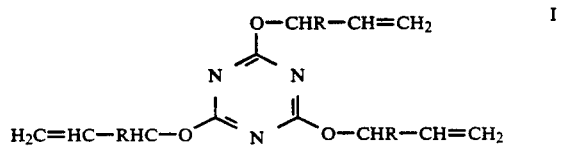

in which R=H, $C_{1-2}$ alkyl, and 40 to 80% by weight of other vinyl monomers as the graft base and
b) 5 to 95% by weight of a thermoplastic polymer as the graft shell, their use as thermoplastic molding compounds and as flame-proofing agents for other synthetic materials.

2 Claims, No Drawings

GRAFT POLYMERS AND THEIR USE AS FLAMEPROOFING AGENTS

This invention relates to graft polymers of
a) 5 to 95% by weight of a copolymer of 20 to 60% by weight of a 1,3,5-triazine derivative corresponding to formula (I)

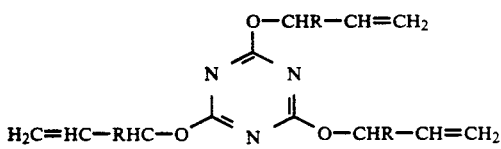

in which R=H, $C_{1-2}$ alkyl, and 40 to 80% by weight of other vinyl monomers as the graft base and b) 5 to 95% by weight of a polymer of styrene, α-methyl styrene, p-methyl styrene, acrylonitrile, methacrylonitrile, $C_{1-8}$ alkyl acrylates, $C_{1-8}$ alkyl methacrylates, maleic imides, maleic anhydride, vinyl ethers, vinyl esters, ethylene, methacrylamide, acrylic acid, methacrylic acid, styrene, sulfonic acid or mixtures thereof as the graft shell.

The graft polymers preferably contain 10 to 85% by weight and more preferably 20 to 70% by weight of the graft base a) and, correspondingly, 90 to 15% by weight and more preferably 80 to 30% by weight of the polymer b).

The graft polymers according to the invention are thermoplastic molding compounds. They are used primarily as additives for other synthetic materials which show thermoplastic behavior and provide them with flame-resistant properties. In addition, the molding compounds containing the graft polymers according to the invention as flame-proofing component show improved melting properties and heat resistance by comparison with molding compounds containing polytetrafluoroethylene.

Accordingly, the present invention also relates to the use of the graft polymers according to the invention as a flameproofing agent for other synthetic materials, preferably in quantities of approximately 0.1 to 20% by weight (based on the flameproofed thermoplastic molding compound). The graft polymers according to the invention are extremely effective as flameproofing agents, but are free from halogen (such as bromine, chlorine, fluorine). They may be combined with other flameproofing additives and often unexpectedly enhance their effect.

The graft polymers according to the invention may be produced by polymerization of the monomers b) in the presence of particulate triazine copolymers a). Any of the methods typically used for graft polymerization may be used for this purpose.

Suitable monomers b) are styrene, p-methyl styrene, α-methyl styrene, acrylonitrile, methacrylonitrile, $C_{1-8}$ alkyl acrylate, $C_{1-8}$ alkyl methacrylate, vinyl acetate, vinyl propionate, N-methyl pyrrolidone, butadiene, isoprene, maleic anhydride, maleic imides, acrylic acid, methacrylic acid, acrylamide, methacrylamide. Styrene, $C_{1-8}$ alkyl acrylates, such as methyl acrylate, ethyl acrylate, hexyl acrylate and dimethyl hexyl acrylate, $C_{1-8}$ alkyl methacrylates (preferably methyl methacrylate) and acrylonitrile are particularly preferred.

Preferred copolymers a) are obtained from triazines corresponding to formula (I) and a mixture of at least two olefinically unsaturated monomers, for example styrene and acrylonitrile or styrene and $C_{1-8}$ alkyl acrylate (preferably methyl acrylate, ethyl acrylate or styrene) and $C_{1-8}$ alkyl methacrylate (preferably methyl methacrylate). In a particularly preferred embodiment, styrene is used in at most such a quantity that product a) contains no more than 50% by weight copolymerized styrene.

The copolymers a) may be prepared continuously or discontinuously by typical emulsion polymerization in aqueous medium. Suitable emulsifiers are, for example, higher aliphatic fatty acids, organic sulfonic acids or sulfuric acid semiesters (anionic emulsifiers) or polyethoxylated phenol derivatives and aliphatic polyethoxylated polyether block copolymers (nonionic emulsifiers).

The polymerization reaction may be initiated by any of the radical initiators typically used, for example by peroxides, peracids, hydroperoxides, persulfates, perphosphates and also by redox initiator systems. Water-soluble inorganic peroxo salts, such as potassium peroxodisulfate and potassium peroxodiphosphate, are particularly preferred.

The copolymerization reaction by which the graft base a) is prepared is preferably continued to high conversions (more than 97% by weight, preferably 99% by weight or higher). This ensures that the polymers are highly cross-linked and have gel contents of more than 90% by weight.

The graft bases a) are generally particulate with a particle size (particle diameter $d_{50}$) of preferably 0.05 to 1μ and more preferably 0.06 to 0.3μ (as determined by light scattering).

Of the monomers polymerized onto the graft base a), mixtures of acrylonitrile and/or methyl methacrylate containing 90 to 30% by weight styrene are preferred.

The graft polymerization is preferably carried out in suspension or dispersion and, more preferably, in emulsion starting from the graft base a) already present in the form of an aqueous emulsion. The monomers are treated by known methods of graft polymerization, for example at temperatures of 40° to 90° C., using the above-mentioned emulsifiers and the above-mentioned initiators.

In the preferred form of graft polymerization in aqueous emulsion, latices (emulsions) of the graft polymers having solids contents of up to about 55% by weight are obtained.

The graft polymers may be isolated from the emulsion, for example by coagulation with inorganic salts, acids or bases or by increasing or reducing the temperature. After drying, the polymers generally accumulate in powder form.

They may be used as thermoplastic molding compounds and also for the production of flameproofed thermoplastic molding compounds based on other synthetic materials.

Preferred molding compounds contain 0.1 to 20% by weight and, more particularly, 0.5 to 10% by weight of the graft polymers according to the invention. The graft polymers according to the invention may be mixed (compounded) with other synthetic materials in the melt, for example in kneaders or screws.

If the other synthetic material is itself an emulsion, this emulsion may be mixed with the emulsion of the graft polymer according to the invention and the resulting mixture further processed to granules or a powder.

This procedure is preferred. Preferred other synthetic materials are polystyrene, polymethyl methacrylate, styrene/acrylonitrile copolymer, methyl methacrylate/styrene copolymer, styrene/maleic anhydride copolymer and graft polymers on thermoplastics containing a rubber base, such as ABS, high-impact polystyrene.

Typical additives, such as antioxidants, lubricants, light stabilizers, fillers, pigments, antistatic agents and, in particular, other flameproofing agents may be added in typical quantities to the molding compounds according to the invention. Suitable other flameproofing agents are chlorine-containing compounds (for example derivatives of hexachlorocyclopentadiene, chlorinated styrenes in polymerized form), bromine-containing compounds (for example octabromodiphenyl, octabromodiphenyl ether, decabromodiphenyl ether, tetrabromobisphenol A, condensation products of tetrabromobisphenol A, tetrabromophthalic anhydride, polymers of tribromostyrene, poly(pentabromobenzyl)acrylate, phosphorus-containing compounds (for example triphenyl phosphate, tricresyl phosphate) and synergists for these flameproofing agents (for example antimony oxide, tin oxide, zinc oxide). The molding compounds according to the invention may be processed, for example, by extrusion, calendering and injection molding to form such molded articles as, for example, housing pats of all kinds and parts for motor vehicles.

EXAMPLES

I) Graft Bases and Comparison Tests 4,000 Parts by weight water and
10 parts by weight Na $C_{14-16}$ alkyl sulfonic acids are introduced into a reactor. After the addition of a solution of 10 parts by weight potassium peroxydisulfate in 200 parts by weight water, the following two solutions are introduced into the reactor over a period of 5 hours at 70° C.

|     | (parts by weight) | | |
| --- | --- | --- | --- |
|     | Solution 1 | Solution 2 | |
| I.1 | 1700 n-BA<br>300 S<br>1000 TAC | 2000 water<br>50 emulsifier | invention |
| I.2 | 2250 n-BA<br>300 S<br>450 TAC | 2000 water<br>50 emulsifier | comparison |
| I.3 | 2700 n-BA<br>300 S | 2000 water<br>50 emulsifer | comparison | n-BA = n-butyl acrylate
S = styrene
TAC = triallyl cyanurate
Emulsifier = Na salt of $C_{14-16}$ alkyl sulfonic acids After the solutions have been introduced, polymerization is completed over a period of 4 hours in 70° C., resulting in the formation of latices having solids contents of approximately 32% by weight and average particle diameters ($d_{50}$) of 0.09 to 0.1 μm. Product I.1 has an iodine value of 68; product I.2 has an iodine value of 17.5. Except for I.3, the polymers have gel contents of 91 to 93%.

II) Graft Polymers and Comparison Tests

616 Parts by weight water and 4,792 parts by weight of the latices according to I) are introduced into a reactor. After heating to 70° C. and initiation with a solution of 5 parts by weight potassium peroxodisulfate in 100 parts by weight water, the following solutions are introduced separately, but at the same time, over a period of 4 hours at 70° C.:

| Solution 1: | styrene | 1,108 parts by weight |
| --- | --- | --- |
|  | acrylonitrile | 430 parts by weight |
| Solution 2: | water | 1,500 parts by weight |
|  | Na salt of<br>$C_{14-16}$-alkyl<br>sulfonic acids | 20 parts by weight |

Polymerization is then completed over a period of 4 hours at 70° C.

| Starting emulsion | | |
| --- | --- | --- |
| II.1 | I.1 | invention |
| II.2 | I.2 | comparison |
| II.3 | I.3 | comparison |

Stable emulsions having solids contents of approximately 36% by weight are obtained.

III) Other Substances Used

1. Styrene/acrylonitrile copolymer containing 26% by weight acrylonitrile, intrinsic viscosity 0.63 g/l (as measured in dimethyl formamide).
2. Graft polymer of 50% by weight styrene and acrylonitrile (28% by weight acrylonitrile and 72% by weight styrene) on 50% by weight crosslinked polybutadiene in the form of coarse particles (average particle diameter 0.4 μm). The graft polymer is used in the form of a powder and in the form of an aqueous emulsion.
3. Mixture of 90% by weight of the graft polymer III.2 and 10% by weight polytetrafluoroethylene (obtained by co-precipitation of corresponding latices).
4. Additives
   4.1 Silicone oil
   4.2 Tetrabromobisphenol A
   4.3 Antimony trioxide $Sb_2O_3$
   4.4 Pentaerythritol tetrastearate

IV) Production of the Molding Compounds Mixtures of I) and III)

The polymer latices I.1 to I.3 are mixed with latex III.2 in the following ratio:
10 parts by weight I.1 to I.3
90 parts by weight III.2
based on polymer solids.

The latex mixtures (emulsion mixtures) are then precipitated with an aqueous solution of $MgSO_4$ in acetic acid and dried.

| Powder IV.1 | from III.2 and I.1 |
| --- | --- |
| Powder IV.2 | from III.2 and I.2 |
| Powder IV.3 | from III.2 and I.3 |

The polymers II.2 to II.3 are coagulated with an aqueous $MgSO_4$ solution and dried to form a powder.

| Powder IV.4 | from II.1 |
| --- | --- |
| Powder IV.5 | from II.2 |
| Powder IV.6 | from II.3 |

V) Molding Compounds

Thermoplastic molding compounds were produced by mixing the powders in a 1.3 l internal mixer at approximately 200° C. After injection-molding to test specimens, burning behavior was determined in accordance with UL 94. In addition to the constituents shown in Table 1, all the molding compounds contained 0.1 part by weight III.4.1, 20 parts by weight III.4.2, 6.5 parts by weight III.4.3 and 3 parts by weight III.4.4 as additives.

The UL 94 classification (V0, V1, V2) is explained, for example, in B. H. Jenker: Brandschutzausrüstung für Thermoplaste in R. Gächter and H. Müller "Taschenbuch der Kunststoff-Additive", Carl Hanser Verlag München, Wien, 1979.

TABLE I

Composition of the molding compounds and burning behavior according to UL 94
(Underwriters Laboratories Test No. 94)

| Molding compounds | III.1 pbw* | III.2 pbw* | III.3 pbw* | IV.1 pbw* | IV.2 pbw* | IV.3 pbw* | IV.4 pbw* | IV.5 pbw* | IV.6 pbw* | UL 94 classification |
|---|---|---|---|---|---|---|---|---|---|---|
| V.1 (invention) | 61 | 35 | — | — | — | — | 4 | — | — | V 0 |
| V.2 (invention) | 57 | 35 | — | — | — | — | 8 | — | — | V 0 |
| V.3 (comparison) | 63 | 35 | 2 | — | — | — | — | — | — | V 0 |
| V.4 (comparison) | 65 | 35 | — | — | — | — | — | — | — | V 2 |
| V.5 (comparison) | 57 | 35 | — | — | — | — | — | 8 | — | V 2 |
| V 6 (comparison) | 57 | 35 | — | — | — | — | — | — | 8 | V 2 |
| V.7 (invention) | 60 | — | — | 40 | — | — | — | — | — | V 0 |
| V.8 (comparison) | 60 | — | — | — | 40 | — | — | — | — | V 2 |
| V.9 (comparison) | 60 | — | — | — | — | 40 | — | — | — | V 2 |

*pbw = parts by weight

We claim:

1. A flameproofed molding composition comprising:
I) 80 to 99.9% by weight of a synthetic material selected from polystyrene, polymethyl methacrylate, styrene/acrylonitrile copolymer, methyl methacrylate/styrene copolymer, styrene/maleic anhydride copolymer and graft polymers on thermoplastics containing a rubber base; and
II) 0.1 to 20% by weight of a graft polymer of
a) 5 to 95% by weight of a copolymer of 20 to 60% by weight of a 1, 3, 5-triazine derivative corresponding to formula (I)

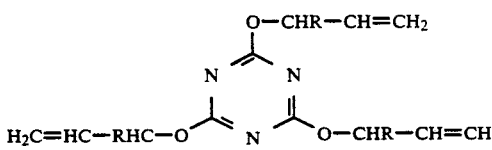

in which R=H, $C_{1-2}$ alkyl, and 40 to 80% by weight of other vinyl monomers as the graft base and
b) 5 to 95% by weight of a polymer of styrene, α-methyl styrene, p-methyl styrene, acrylonitrile, methacrylonitrile, $C_{1-8}$ alkyl acrylates, $C_{1-8}$ alkyl methacrylates, maleic imides, maleic anhydride, vinyl ethers, vinyl esters, ethylene, methacrylamide, acrylic acid, methacrylic acid, styrene, sulfonic acid or mixtures thereof as the graft shell.

2. The flameproofed molding composition as claimed in claim 1 wherein the graft polymer II) contains 10 to 85% by weight of the graft base a) and 90 to 15% by weight of the polymer b).

* * * * *